US009223853B2

(12) United States Patent
Shukla et al.

(10) Patent No.: US 9,223,853 B2
(45) Date of Patent: Dec. 29, 2015

(54) QUERY EXPANSION USING ADD-ON TERMS WITH ASSIGNED CLASSIFICATIONS

(71) Applicant: MICROSOFT CORPORATION, Redmond, WA (US)

(72) Inventors: Pushpraj Shukla, Kirkland, WA (US); Atul Kumar Gupta, Kirkland, WA (US); Yuan Wang, Sammimish, WA (US); Elliot Kuehl Olds, Bellevue, WA (US); Massimo Mascaro, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 189 days.

(21) Appl. No.: 13/720,407

(22) Filed: Dec. 19, 2012

(65) Prior Publication Data
US 2014/0172901 A1    Jun. 19, 2014

(51) Int. Cl.
*G06F 17/30*    (2006.01)

(52) U.S. Cl.
CPC .... *G06F 17/30672* (2013.01); *G06F 17/30864* (2013.01)

(58) Field of Classification Search
CPC ............ G06F 17/2775; G06F 17/2827; G06F 17/30634; G06F 17/30654; G06F 17/30864; G06F 17/30011; G06F 17/30672; G06F 17/30873; G06F 17/30265
USPC ................................................ 707/759, 765
See application file for complete search history.

(56) References Cited

U.S. PATENT DOCUMENTS

| 6,480,843 | B2 | 11/2002 | Li |
| 8,122,048 | B2 | 2/2012 | Dettinger et al. |
| 8,296,288 | B2 | 10/2012 | Lu et al. |
| 8,301,615 | B1 * | 10/2012 | Riley et al. ............... 707/707 |
| 2002/0178223 | A1 * | 11/2002 | Bushkin .................. 709/205 |
| 2005/0289168 | A1 * | 12/2005 | Green et al. ............. 707/101 |
| 2008/0294618 | A1 * | 11/2008 | Hamilton et al. ............ 707/5 |
| 2009/0327257 | A1 * | 12/2009 | Abouzeid et al. ............ 707/4 |
| 2010/0070506 | A1 | 3/2010 | Whang et al. |
| 2011/0302156 | A1 | 12/2011 | Vadlamani et al. |
| 2012/0226687 | A1 | 9/2012 | Xu et al. |

OTHER PUBLICATIONS

Billerbeck, et al., "Query Expansion using Associated Queries", In Proceedings of Twelfth International Conference on Information and Knowledge Management, Nov. 2, 2003, 8 pages.

\* cited by examiner

*Primary Examiner* — Apu Mofiz
*Assistant Examiner* — Fariborz Khoshnoodi
(74) *Attorney, Agent, or Firm* — Dave Ream; Jim Ross; Micky Minhas (57) ABSTRACT

In various embodiments, systems and methods are provided for query expansion using add-on terms with classifications. A query is received. An add-on term is identified for the query. A classification is determined for the add-on term. The classification is a designation associated with the add-on term that is used to distinguish the add-on term from the query. An appended query is generated based on the add-on term. The appended query is generated by concatenating the query with the add-on term. The appended query is executed on a resource stack as a single reformulated query to identify one or more resources. Upon execution, the classification of the add-on term distinguishes the one or more resources identified for the add-on term based on tagging the one or more resources with the classification of the add-on term. The appended query is used to generate content items.

20 Claims, 6 Drawing Sheets

410 — ORIGINAL QUERY: FLIGHTS TO LOS ANGELES — 410a

416 — ADD-ON TERMS: SEATTLE, WA; SEA-TAC; LAX
   416a          416b       416c

418 — CLASSIFICATION: CURRENTLOCATION; ORIGINALPORT; DESTINATIONPORT
   418a              418b            418c

420 — APPENDED QUERY: FLIGHTS TO LOS ANGELES SEATTLE, WA SEA-TAC LAX — 420a

QUERY EXPANSION USING ADD-ON TERMS WITH ASSIGNED CLASSIFICATIONS

BACKGROUND

In information retrieval, query expansion focuses on adding information to a query to obtain information resources relevant to the query. Query expansion includes the process of reformulating an original query to improve retrieval performance in information retrieval operations such as web and advertising searching. Several different methods may be used to expand queries, especially query expansion to perform particular IR tasks.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention are provided for query expansion based on add-on terms with assigned classifications. A query is received. The query may be entered into a web search engine and expanded using add-on terms to the query to retrieve relevant information resources. The query may be a phrase comprising one or more words meant to be treated as a single term. An add-on term is identified for the query. The add-on term may be any term directly or indirectly related to the query which is appended to the query. The add-on term may also be a reformulation of the query. A classification is determined for the add-on term. The classification is a designation associated with the add-on term that is used to distinguish the add-on term from the query. The classification may also signify a relationship between the add-on term and the query. The classification relationship may be implicitly or explicitly defined. The add-on term retains the associated classification independent of the query throughout the search process. An appended query is generated based on the add-on term. The appended query is generated by concatenating the query with the add-on term. The appended query is executed on a resource stack as a single reformulated query to identify one or more resources. Upon execution, the classification of the add-on term distinguishes the one or more resources identified for the add-on term based on tagging the one or more resources with the classification of the add-on term. The appended query is used to generate content items based on the one or more resources. The one or more resources are tagged with the classification of the add-on term.

BRIEF DESCRIPTION OF THE DRAWINGS

The present invention is described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

Information retrieval with query expansion may include reformulating a query to improve retrieval performance by adding terms to the query. For example, for a query [Flights to Los Angeles] received from a user in Seattle, the search engine may add the current location of the user (e.g., Seattle, Wash.), the origin airport (e.g., Seattle-Tacoma Airport) and the destination airport (e.g., LAX). Adding additional terms to the query improves the relevant results identified for the search because search functionality on the web operates with indexes used to match words and relevant resources. By way of background, a word-phrase method works at the word-phrase level, where a new search term may be in the Conjunctive Normal Form (e.g., [Flights to (Los Angeles or LAX)]). The terms Los Angeles and LAX are used interchangeably in identifying results. As such, the Conjunctive Normal Form does not disambiguate between different contexts for each word (e.g., Los Angeles: City and LAX: Airport). Adding in directly related terms (e.g., current location of the user) is also not accommodated in query reformulation using the word-phrase method. Further, using a multi-query method generates multiple queries to accommodate the additional terms (e.g., [Flights to Los Angeles], [Flights to LAX], or [Flights from Seattle, Wash. to LAX) such that results are generated and combined. In this regard, computing each individual query is computationally expensive because of the repetitive processing of overlapping core terms within each query (e.g., Flights to Los Angeles).

Embodiments the present invention introduce a process that allows for identifying, for a query, a plurality of add-on terms. Each of the plurality of add-on terms is concatenated with the query and executed on a resource stack as a single reformulated query while retaining a classification identified for each add-on term. The original query retains a default classification. In operation, a query is received, for example, [Flights to Los Angeles]. The query may be entered into a web search engine and expanded using add-on terms to the query to retrieve relevant information resources. The query may be a phrase comprising one or more words meant to be treated as a single term. An add-on term is identified for the query (e.g., Seattle, Wash.; SEA-TAC; or LAX). The add-on term may be any term directly or indirectly related to the query which is appended to the query. The add-on term may also be a reformulation of the query. A classification is determined for the add-on term (e.g., Current Location, Origin Airport, and Destination Airport, respectively). The classification is a designation associated with the add-on term that distinguishes the add-on term from the query. The classification may signify a relationship between the add-on term and the query. The classification relationship may be implicitly or explicitly defined. The add-on term retains the association with the classification independent of the query throughout the search process. In embodiments, the classification is implemented using a type system that associates a type (e.g., CurrentLocation type, OriginPort type, DestinationPort type) with each add-on term. The type system ensures that each term retains its classification using strong typing. Strong typing is a feature within the typing system that specifies the restriction for the classification. An appended query is generated based on the add-on term. The appended query is a concatenated reformulation of the query using the add-on term. By way of illustration only, an example format for the reformulated query may be Flights to Los Angeles Seattle, Wash., SEA-TAC, LAX or [Flights to Los Angeles AddQuery: CurrentLocation{Seattle, Wash.}, AddQuery: OriginPort{SEA-TAC}, AddQuery: DestinationPort {LAX}]. In this regard, the classification for each add-on term is retained and the particular context of Los Angeles and LAX may be distinguished. Further, an add-on term like Seattle, Wash. that is indirectly related to the query may be added to the same single reformulated-query while also retaining its classification.

The reformulated-query is executed in the resource stack as a single query without creating new queries in the resource stack. For example, [Flights to Los Angeles; Seattle, Wash.; SEA-TAC; LAX] are the words looked-up in the resource server indexes to identify relevant resources. As discussed above, each add-on term retains a classification independent of the query. The reformulated-query is computationally less expensive. For example, multiple queries based on non-concatenated queries result in multiple calls to a search or advertising resource server that is serving a search engine (e.g., search engine 208) and, as such, increases the server load. The reformulated-query improves the server query load because it requires a single call to a resource stack for the original query terms [Flights to Los Angeles]. The appended query is used to generate content items (e.g., search engine results pages) based on the one or more resources. The one or more resources are tagged with the classification of the add-on term.

In a first aspect of the present invention, computer-readable media having computer-executable instructions that, when used by one or more computing devices, cause the one or more computing devices to perform a method for query expansion based on add-on terms with assigned classifications. The method includes receiving a query. The method further includes identifying an add-on term for the query. The method also includes determining a classification for the add-on term. The method further includes generating an appended query by concatenating the query with the add-on term. The appended query is executed on a resource stack as a single reformulated query to identify one or more resources. Upon execution, the classification of the add-on term distinguishes the one or more resources identified for the add-on term based on tagging the one or more resources with the classification of the add-on term. The method further includes utilizing the appended query to generate content items identified based on the appended query.

In a second aspect of the present invention, computer-readable media having computer-executable instructions that, when used by one or more computing devices, cause the one or more computing devices to perform a method for query expansion based on add-on terms with assigned classifications. The method includes receiving an appended query. The appended query has been concatenated using a query and an add-on term. The add-on term is assigned a classification. The method further includes executing the appended query on a resource stack as a single reformulated query. The method also includes identifying one or more resources for the appended query. Each of the one or more resources includes at least on meta-section. The method further includes tagging the at least one meta-section that includes an instance of the add-on term with the classification of the add-on term. The classification distinguishes the meta-section identified for the add-on term. The method also includes generating a plurality of content items based on the one or more resources. The one or more resources are tagged with the classification of the add-on term.

In a third aspect of the present invention, a method for query expansion using add-on terms with assigned classifications. The method includes receiving a query. The query is associated with a default classification. The method further includes identifying an add-on term for the query. The method also determining a classification for the add-on term. The classification distinguishes query meta-sections from add-on term meta-sections. The method includes generating an appended query by concatenating the query with the add-on term. The method further includes executing the appended query on a resource stack as a single reformulated query. The method also includes identifying one or more resources based on the appended-query. Each of the one or more resources includes query meta-sections and add-on term meta-sections with each query meta-section and each add-on term meta-section having an instance of the respective query and the add-on term. The method includes tagging the add-on term meta-sections with the classification of the add-on term to distinguish the add-on meta-sections from the query meta-sections. The method also includes selecting a subset of the add-on term meta-sections based on a plurality of features of the add-on term meta-sections, wherein a feature is restriction assigned to the add-on term meta-sections. The method further includes combining query meta-sections and the subset of add-on term meta-sections to generate a plurality of content items. The method also includes displaying the plurality of content items.

Figure 1:
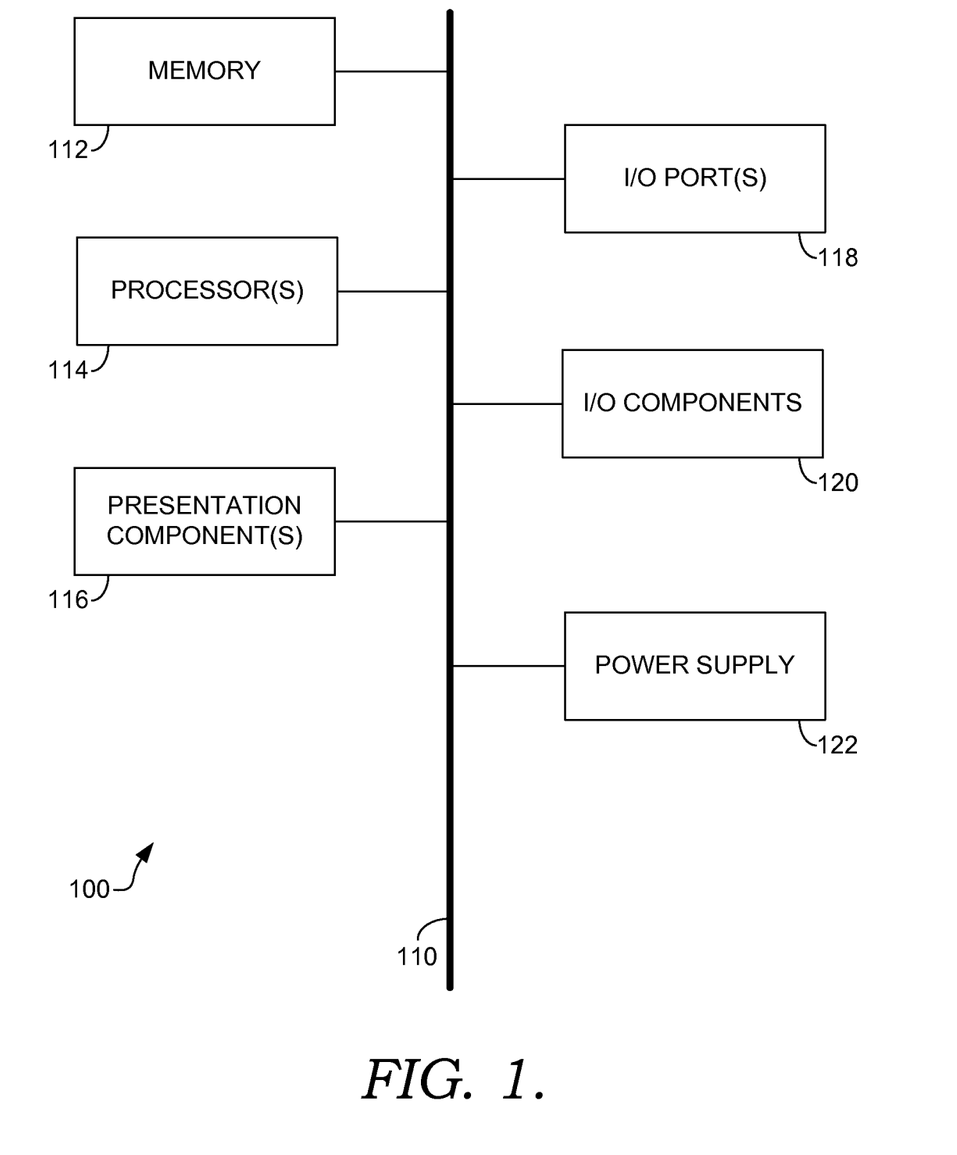
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media may be non-transitory media. Non-transitory computer-readable media exclude transitory propagating signals per se. Computer-readable media can be any available media that can be accessed by computing device 100 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
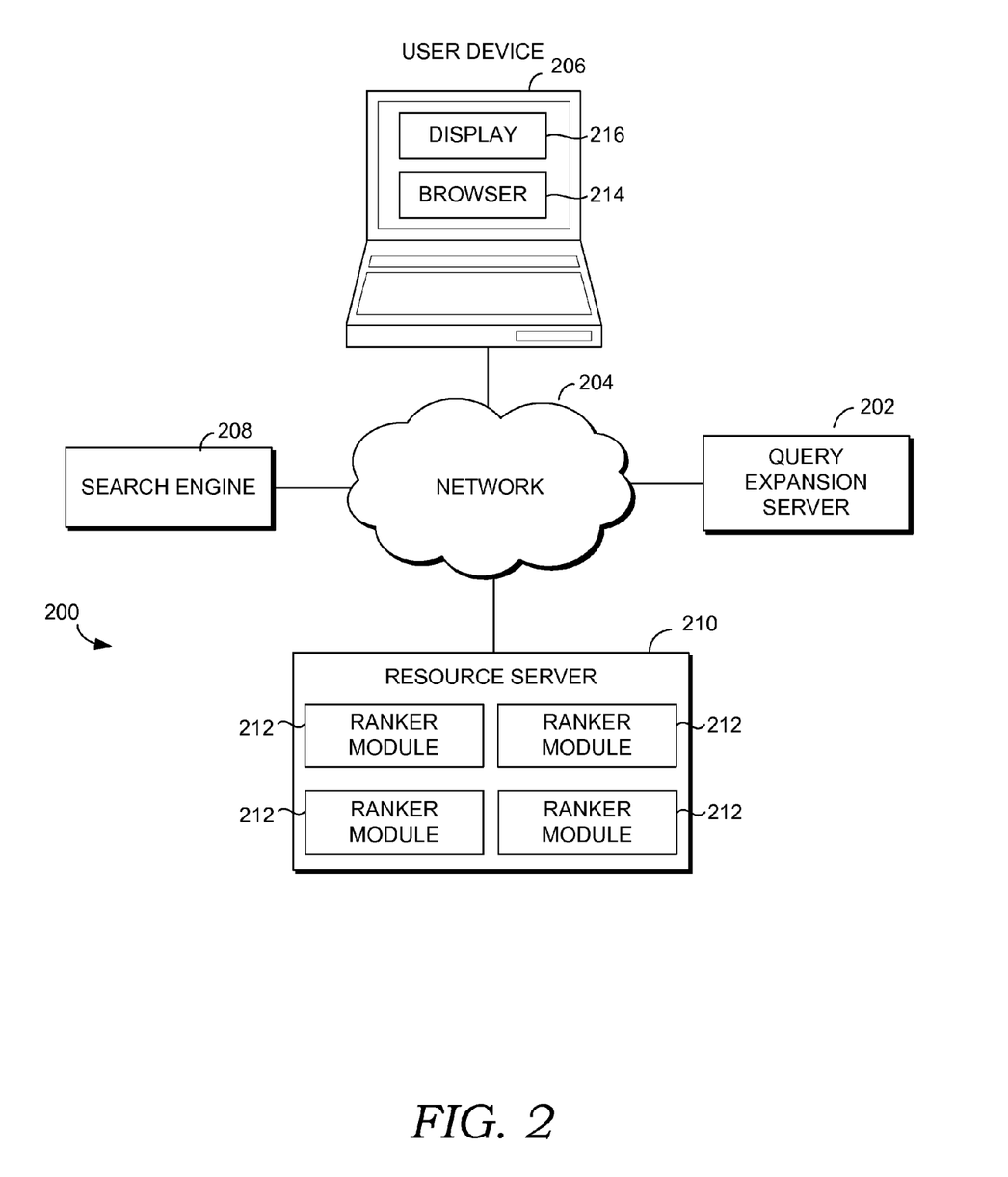
FIG. 2 is a block diagram of an exemplary network environment in which embodiments of the invention may be employed.

With additional reference to FIG. 2, a block diagram depicting an exemplary network environment 200 suitable for use in embodiments of the invention described. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The network environment 200 includes a network 204, a user device 206, and a search engine 208. The network environment 200 also includes a query expansion server 202 and resource server 210 comprising a plurality of ranker modules 212. Each of the components shown in FIG. 2 may be any type of computing device, such as computing device 100 described with reference to FIG. 1, for example. The components may communicate with each other via a network 204, which may include, without limitation, one or more local area networks (LANs) and/or wide area networks (WANs). Such networking environments are commonplace in offices, enterprise-wide computer networks, intranets, and the Internet. It should be understood that any number of query expansion servers, resource servers, search engines, and user devices may be employed within the network environment 200 within the scope of the present invention. Each may comprise a single device or multiple devices cooperating in a distributed environment. For instance, the query expansion server 202 may comprise multiple devices arranged in a distributed environment that collectively provide the functionality of the query expansion service described herein. Additionally, other components not shown may also be included within the network environment.

The user device 206 may include any type of computing device, such as the computing device 100 described with reference to FIG. 1, for example. Generally, the user device 206 includes a browser 214 and a display 216. The browser 216 is configured to render web pages, for instance, search engine results pages (SERPs), in association with the display 216 of the user device 206. The browser 214 is further configured to receive user input of requests for various web pages (including search engine home pages), receive user inputted search queries (generally input via a user interface presented on the display 216 and permitting alpha-numeric and/or textual input into a designated search input region) and to receive content for presentation on the display 216, for instance, from the search engine 208. The browser 214 may be any suitable type of web browser such as Internet Explorer®, Firefox®, Chrome®, Safari®, or other type of software configured to enable submission of search queries as disclosed herein. It should be noted that the functionality described herein as being performed by the browser 214 may be performed by any other application capable of rendering web content. Any and all such variations, and any combination thereof, are contemplated to be within the scope of embodiments of the present invention. The display 216 is configured to present various content items.

With continued reference to FIG. 2, a search engine 208 is shown that provides functionalities for a content-based search engine. In particular, search engine 208 provides search functionality that operates with the query expansion methods of the present invention. Generally, search engine 208 provides web crawling, indexing, and searching in association with other components in the network environment in order to provide content items. For example, the search engine 208 mines data available and maintains real-time information in a resource server (e.g., resource server 210) using a web crawler—an automated browser which follows every link on the site. The content of each page is then analyzed to determine how it should be indexed (for example, words can be extracted from the titles, page content, headings, or special fields). Data about web pages are stored in indexed databases (e.g., resource server 210) for use in later queries. When a user enters a query into a search engine (e.g., search engine 208), the query is processed, based on steps described herein, to identify content items (e.g., search engine results pages) for the query. The query may be received, for instance, via a query-input region or search box presented in association with a general web search domain.

The search engine 208 may also provide interface functionality that facilitates user view of and interaction with content items identified for the search query. In this description, "content items" may refer to information retrieved based on queries, or their reformulations. The term "content items" is defined to include search results and add-on terms that are retrieved based on queries. More generally, content items include retrieved information resources and aids in identifying additional resources. The interface functionality provides user interfaces that allow users to browse and/or search the various content items provided by the resource server 210 through the search engine 208. Content items may also be presented in accordance with the rankings determined for the various content items. Additionally, content items may be presented in the user interface with snippets describing the content items. Add-on terms may be presented in bold in the snippets. It is contemplated that several presentation variations may be used for content items in embodiments of the present invention. A user may also employ a web browser or other mechanism on the user device 206 to communicate with the search engine 208.

The resource server 210 generally operates to provide relevant resources for the query based on an appended query received from the query expansion server 202. The resource server 210 may include a searchable database. The searchable database may be a document database or an advertising database. For example, the resource server 210 may store indexed documents from a search engine (e.g., search engine 208) to facilitate fast and accurate information retrieval. Indexed documents may include several media types including full-text natural language documents, video, audio, and graphics. The searchable database may be an advertisement database that stores advertisements used in online marketing and delivers them to website visitors. The content of the advertising server may also be updated by the search engine 208 or other source such that the website or webpage on which ads are displayed contain new advertisements. The resource server 210 retrieves available advertisement placements based on an appended query received from the query expansion server 202. The documents and advertisements associated with the resource server 210 may be collectively referred to herein as resources. In embodiments, the resource server 210 is an inverted index that stores mappings from the resources associated with the resource server 210. The inverted index is supported by the search engine 208 indexing of documents and advertising data.

Additionally, the resources (e.g., documents or advertisements) in the resource server 210 are associated with meta-sections that are used in retaining a classification of a term executed on the resource server 210. For example, the documents in the resource server 210 include meta-sections that define different sections of the document. Each document has been parsed and labeled into meta-sections (e.g., zone-based or structure-based labeling techniques). The meta-section may classify and label individual sections of each document. Labels may include, for example, title, author, abstract, keywords, texts header, and footer. Advertisements may also be associated with similar meta-sections associated with meta-data for the advertisement. For example, for AQVA® a fragrance made by BVLGARI® of Rome, Italy, the metadata may include a brand: BVLGARI® and a Product: Perfume, defined as meta-sections. Any and all such variations of parsing techniques for resources, and any combination thereof, are contemplated to be within the scope of embodiments of the present invention.

The resource server 210 receives an appended query and executes the appended query on a resource stack. The resource stack operates to hold queries pushed on to the resource stack to be executed to return content items. The appended query has been concatenated using the query and the add-on terms for the query. The resource stack executes the appended query as a single reformulated-query on the resource stack; however maintains the classification for each identified add-on term with a classification. When an appended query is executed on the resource stack, the resource server 210 locates resources containing the words in the query based on an index. For example, a plurality of documents is identified based on the index. Each document includes one or more meta-sections where each add-on term is identified. The classification for each add-on term is retained during the search process which serves to distinguish the add-on term meta-sections from the query-term meta-sections. The same meta-section may be associated with a plurality of updated meta-section that includes an instance of an identified add-term. At a high level, a new alias is developed for each add-on term/meta-section pair such that the add-on term remains associated with the meta-section within the document. In other words, executing a query based on an inverted index identifies a plurality of documents, with each add-on term identified in a document associated with a meta-section of the document (e.g., a Title meta-section or a Body meta-section). In order to retain the classification for the add-on term, the meta-section label is updated to reflect the add-on term for which it was identified.

By way of illustration for further explanation, an appended query—[Flights to Los Angeles AddQuery: CurrentLocation{Seattle, Wash.}, AddQuery: OriginPort{SEA-TAC}, AddQuery: DestinationPort {LAX}]) may be executed on a resource stack. A plurality of documents is identified (e.g., a first document and a second document). In embodiments, the first document and the second document are a match for all the terms in the appended query. The label of a meta-section that contains the add-on term is updated for each add-on term identified in the meta-section. For example, the term {Seattle, Wash.} is identified in the Title meta-section of the first document, so the Title label is updated to TitleCurrentLocation. Also the term {SEA-TAC} is identified in the Body meta-section of the second document, so the Body is updated to BodyOriginPort. In this regard, the documents identified for the additional terms retain a classification that may be analyzed in parallel with the original query, Flights to Los Angeles, default classification. It is contemplated that similar steps described hereinabove may be applied to the default classification for the original query.

The add-on meta-sections may be analyzed alongside the query meta-sections to identify content items. Meta-sections generally include to specific characteristics of the identified resources (e.g., query stems, tokens, concepts). In embodiments, the features are used to combine the query-meta sections and the add-on term meta-sections. Features refer to specific restriction assigned to a meta-section. A feature is used to filter out a subset of meta-sections that refine the content items. For example, for a particular add-on term (e.g., {Seattle, Wash.}) the feature ExactMatch in the Title (e.g., TitleCurrentLocation) may be factored into add-on term meta-sections to identify content items. It is contemplated that several types of features may be used in combining meta-sections identified for add-on terms to the meta-sections identified for the original query term.

The resource server 210 also manages a plurality of ranker modules 212 that provide machine-learning for developing classifications and generating content-items based on classifications. A ranker module 212 uses algorithms through machine learning to identify complex relationships for search data. The algorithm studies portions of historical search data to capture classification information that may be used in accordance with embodiments of the present invention. The ranker also identifies patterns to make predictions based on new search data. The ranker is trained with particular search data to develop classifications based on past search behavior. The ranker also develops processes for combining the classifications of the original query and add-on terms upon identification of resources.

The resource server 210 may be associated a plurality of rankers. Each ranker may be associated with different types of search areas (e.g., a vertical information domain). A vertical information domain is a content site generally provided in association with a search engine 208 that provides content and organization specific to a particular topic, for example, computing and technology, travel, names, and commerce. The resource server 210 identifies the type of query, and the ranker associated with the query is used for further processing of the query to identify resources. It is contemplated that a query may be associated with more than one ranker and as such processed on more than one ranker. The ranker employs the classifications associated with the particular ranker and the machine-learned processing of queries to combine resources identified based on the appended query.

In embodiments, the ranker also performs a ranking function of derived content items form processing the different resources from classifications. The ranker module 212 operates to rank multiple content items. A number of different ranking techniques may be employed by the ranker module 212 in accordance with various embodiments of the present invention. For instance, in some embodiments ranking may be performed at least in part based on a relevance threshold to the query and the add-on terms. Each ranker may have a ranking associated with the ranker module 212. The ranking function of a ranker module 212 may be based on a variety of different factors, associated specifically with the type of ranker module 212. It is contemplated that the resource server 210 may further rank all content items prior to forwarding content items to the search engine 208 for display on the user device 206.

Figure 3:
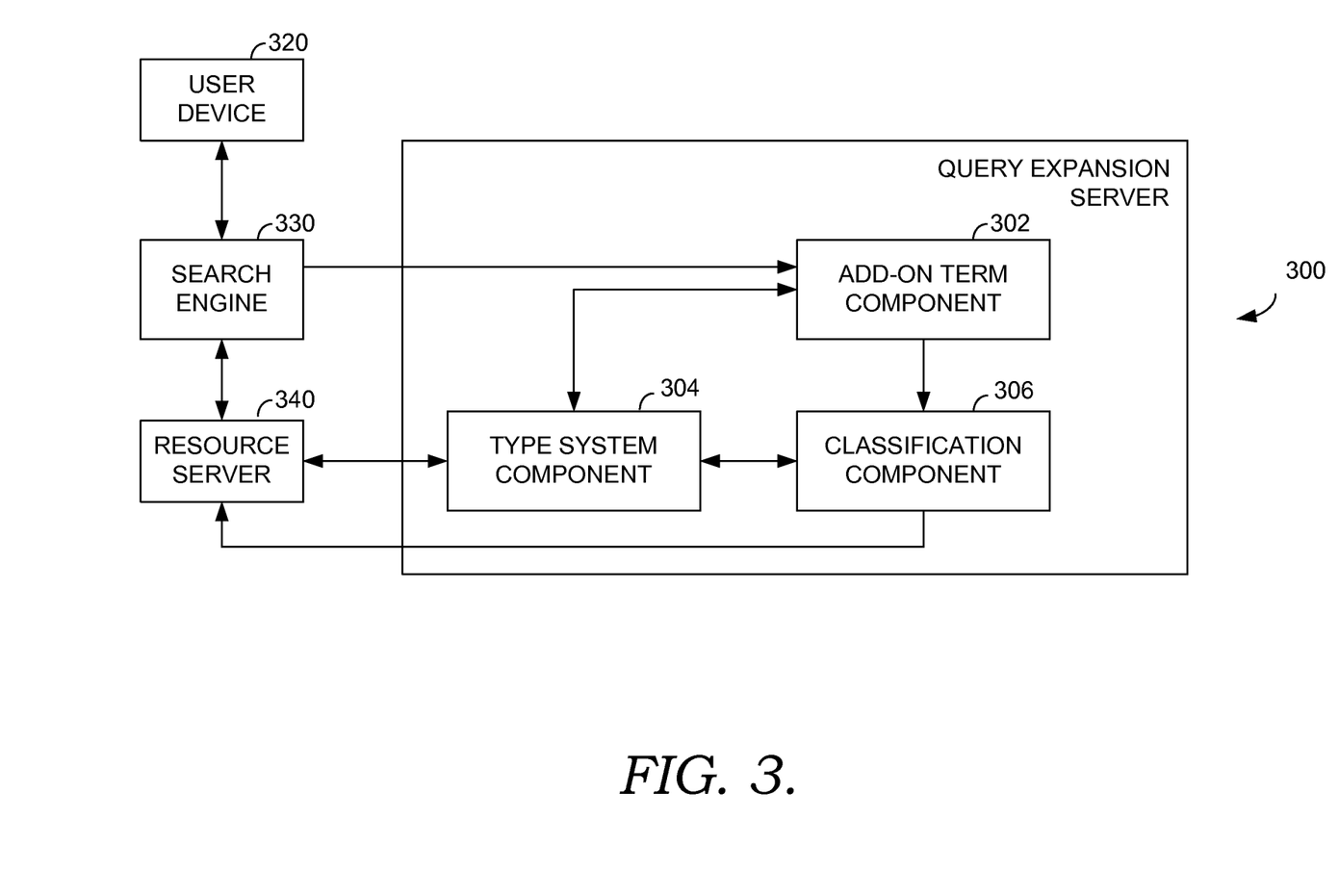
FIG. 3 is a block diagram of an exemplary query expansion server in accordance with an embodiment of the present invention.

Referring now to FIG. 3, an exemplary query expansion server 300 is shown. Generally, the query expansion server 300 uses a query to generate a plurality of add-on terms with assigned classifications in order to generate content items for the query. The query expansion server 300 includes an add-on term component 302, type system component 304, and a classification component 306. FIG. 3 also includes the user device 320, the search engine 330, and the resource server 340, as previously described in FIG. 2. Each component may comprise a program, routine, application, or other machine-executable code capable of performing the actions discussed herein. One skilled in the art will recognize that the components shown in FIG. 3 are provided for illustrative purposes only and other arrangements may be provided in accordance with various embodiments of the present invention. As noted above, the query expansion server 300 may comprise a single computing device, although it is likely that the query expansion server 300 would be implemented as an internal or external component of the search engine in multiple computing devices in a distributed computing environment. The current illustration is merely an exemplary illustration and other embodiments are contemplated within the scope of the invention.

Generally, the query expansion server 300 receives input (e.g. query) from search engine 330. A query may include, by way of example only, alpha-numeric and/or textual input. The query expansion server 202 includes an add-on component 302 that generally processes input received at the query expansion server 202. The add-on component 302 of the query expansion server 300 processes and forwards the query and add-on terms to the classification component 306. The add-on term component 302 manages the identification of add-on terms for the query. Add-on terms may be directly or indirectly related to the query or a term in the query. The add-on term may also be a reformulation of the query term. At a high-level, an add-on term is determined based on the context of occurrence of the query. Identifying add-on terms may be based on query expansion techniques (e.g., stemming of words, correction of spelling errors, and synonyms). Context-based query expansion methods may be used to identify directly related query expansion terms (e.g., explicit terms) and indirectly related terms (e.g., implicit terms) surrounding the particular query. For example, Flights to Los Angeles may include LAX as an explicitly identifiable term; however an implicitly identifiable term may be SEA-TAC airport, based on the location from which the query is generated. Any and all such variations, and any combination thereof, are contemplated to be within the scope of embodiments of the present invention.

In embodiments, the add-on term component 302 may also use the type system component 308 to determine relevant default types for the query-context to identify add-on terms. The type system component 304 maintains a variety of types associated with queries. The type system may include a plurality predetermined types based on machine learning using search data in the resource server 210. Different types may be specifically associated with different ranker modules 212. For example, a travel ranker module may include types Origin-Port, DestinationPort, and CurrentLocation. The type system component 304 defines a syntactic framework for classifying add-on terms according to the type of information they represent. As such, the add-on component 302 may refer to the different relevant types in identifying add-on terms for a particular query. For example, a name query (e.g., [Winston Churchill Speeches]) may be associated plurality of default name types e.g., Profession, Nationality, Associates, etc. As such, an add-on term may be generated based on the particular type for the query and context in which it occurs. In this case, the query indicates a name query, and the Profession type is a relevant default type, helps generate [British Prime Minister] as an add-on term.

Further, identifying add-on terms may also include disambiguating a query based on context. For example, [Winston Churchill Novel] and [Winston Churchill Speeches] may generate [Winston Church Novel]+[Novelist] in contrast to [Winston Churchill Speech]+[British Prime Minister] both based on the same type Profession; however distinguished based on context. It is contemplated that an identical name query may also be disambiguated based on the types of add-on terms associated with the name query. In embodiments, a plurality of add-on terms may be generated for a query and only a threshold number of add-on terms utilized based on a relevance score. The relevance score is calculated for each identified add-on term with reference to the query. It is contemplated that several different context-based methods and ranking methods may be used to identify add-on terms for a query term in accordance with embodiments of the present invention.

With continued reference to FIG. 3, the classification component 306 operates to determine a classification for add-on terms for the query. The classification is a designation associated with the add-on term that is used to distinguish the add-on term from the query. The classification may also signify a relationship between the add-on term and the query. The classification relationship may be implicitly or explicitly defined based on the context of occurrence of the query. The add-on term retains the associated classification independent of the query throughout the search process. In embodiments, the classification is a strong type. A predetermined set of strong types may be generated in the type system component 304. The type system component 304 utilizes analysis information of resources in the resource server 210 and generates strong types (e.g., Profession, ProductType, TechnicalLanguage) for different kinds of resources in ranker modules 212 (e.g., Name, Computing and Electronics, and Technical queries). A strong type specifies a restriction on how the add-on term is used to identify resources. Strong types restrict intermixing of add-on term meta-sections and query meta-sections. Predetermined strong types and classifications in general may also be based on the context of occurrence. For example, [Flights to Los Angeles] may trigger traveling classifications such as OriginPort, DestinationPort, CurrentLocation, while [Aqva® 3.4 oz cost] may trigger product classifications such as Brand and ProductType. During the search process, each add-on term retains its classification such that resources identified may be combined more efficiently.

As previously discussed, the resource server 210 generally operates to provide relevant resources for the query based on an appended query received from the query expansion server 202. The resource server 210 executes the appended query on a resource stack a single concatenated-reformulated-query and provides content items to the content items to the search engine. The appended query may be in a specific format that allows the resource server 210 to identify the original query and each add-on term and its assigned classification. The appended query is used to identify resources on the resource server 210 based on a stored mapping of resource (e.g., an inverted index). The resources (e.g., documents or advertisements) in the resource server 210 are associated with meta-sections that are used in retain the classification of each add-on term in an appended query executed on the resource server 210 stack. The resource stack operates to hold queries pushed on to the resource stack to be executed in order to return content items. The resource server executes the query as a single query on the resource stack and retains the classification for each identified add-on term with a classification. The resource server does not execute the appended query on the stack more than once.

Figure 4:
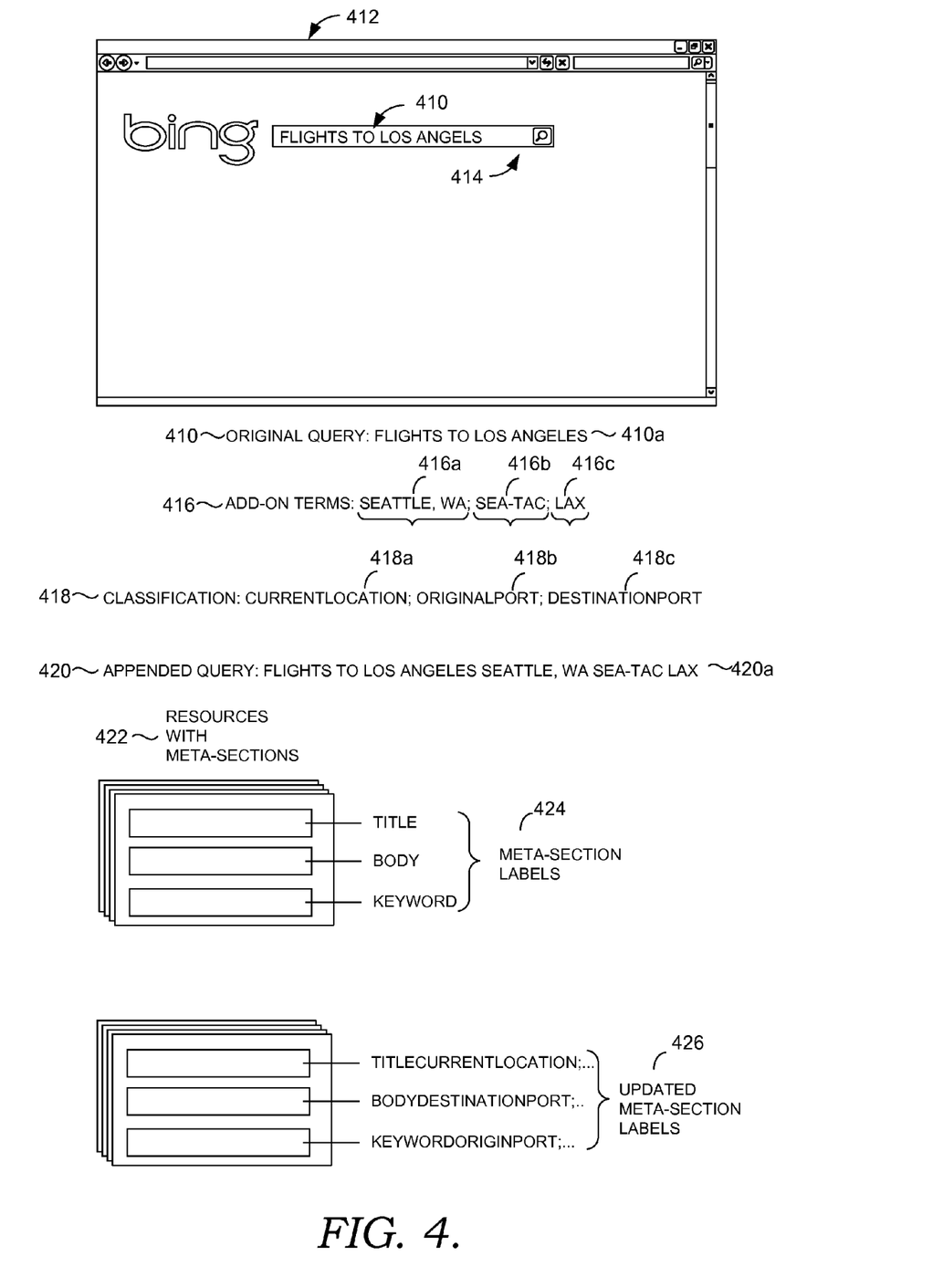
FIG. 4 is a schematic diagram showing a method for query expansion using add-on terms with an embodiment of the present invention.

As shown in FIG. 4, by way of illustration, in FIG. 4, a query 410 is received (e.g., original query—Flights to Los Angeles 410a). The query 410 may be received, for instance, via a browser 412 having a query-input region or search box 414 presented in association with a general web search domain. A plurality of add-on terms 416 (e.g., Seattle, Wash. 416a; SEA-TAC 416b; LAX 416c) is identified for the query. Each add-on term is a term directly or indirectly related to the query which is appended to the query. A classification 418 is determined for the add-on term (e.g., CurrentLocation 418a, OriginPort 418b; DestinationPort 418c). The classification 418 is a designation that is used to distinguish the add-on term. The classification may also signify a relationship between the add-on term and the query. Each add-on term retains the associated classification 418 independent of the query throughout the search process. An appended query 420 is generated based on the add-on terms. The appended query 420 is a concatenated reformulation of the query (e.g., Flights to Los Angeles Seattle, Wash., SEA-TAC LAX 420a) using the add-on terms. The reformulated-query 420a is executed on a resource stack as a single query. A plurality of resources 422 is identified; each resource includes one or more meta-sections with a meta-section label 424 where each query term is identified. The classification 418 for each term is retained during the search process based on the meta-sections identified for each resource. Each add-on term 416 identified in a resource 422 is associated with a meta-section of the resource (e.g., a Title meta-section, a Body meta-section, Keyword meta-section). In order to retain the classification 418 for the add-in term 416, the meta-section label 424 is updated with an updated meta-section label 426 to reflect the meta-section for which an add-on term was identified.

Figures 5, 6:
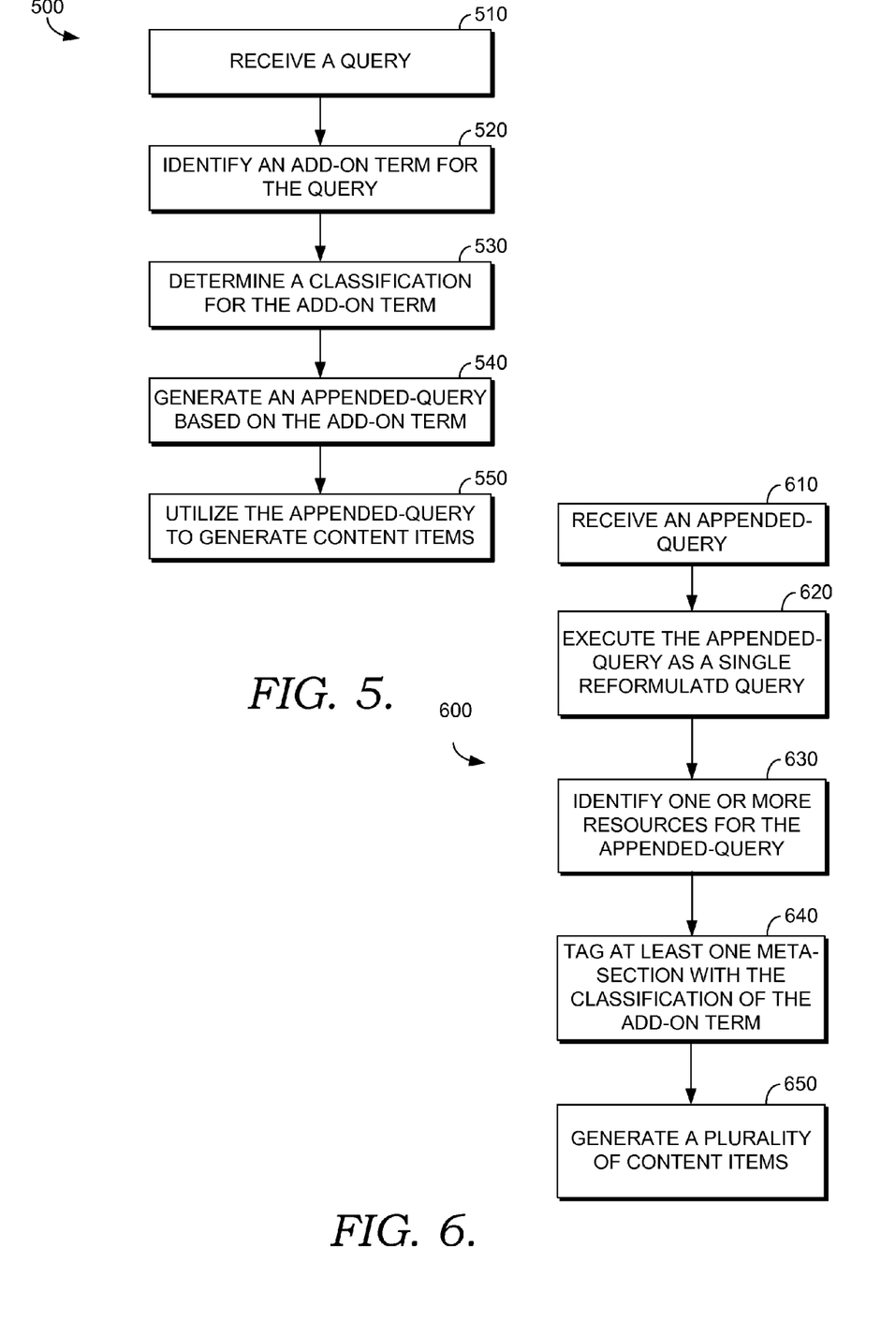
FIG. 5 is a flow diagram showing a method for query expansion using add-on terms with an embodiment of the present invention.
FIG. 6 is a flow diagram showing a method for query expansion using add-on terms with an embodiment of the present invention.

Turning now to FIG. 5, a flow diagram is provided that illustrates a method 500 for query expansion using add-terms with assigned classifications. At block 510, a query is received. The query is associated with a default classification. At block 520, an add-on term is identified for the query. In embodiments, identifying the add-on term includes identifying a plurality of add-on terms for the query, ranking the plurality of add-on terms based on a relevance threshold, and selecting one or more add-on terms for the query. The classification may be identified based on a type system that includes a plurality of predetermined strong types. An appended query is generated based on the add-on term, as shown at block 530. The appended query is executed on a resource stack as a single concatenated-reformulated-query. Executing the appended query on the resource stack retains the classification of the add-on term independently of the query. At block 540, the appended query is used to generate content items for the appended query.

Turning now to FIG. 6, a flow diagram is provided that illustrates a method 600 for query expansion using add-terms with assigned classifications. Initially, as shown at block 610, an appended query associated with one or more add-on terms is received. Each add-on term is assigned a classification. The classification may be a strong type from a type system. As shown at block 620, the appended query is executed as a single reformulated-query on a resource stack. Each add-on term retains a classification of the add-on term. Executing the add-on term on the resource stack includes identifying query meta-sections and add-on term meta-sections. At block 630, one or more resource is identified for the appended query. The one or more resources include at least one meta-section. At block 640, the at least one meta-section is tagged with the classification of the add-on term. The at least one meta-section includes an instance of the add-on term. The classification distinguishes the meta-section identified for the add-on term. At block 650, the add-on term .content items are generated based on the one or more resources.

Figure 7:
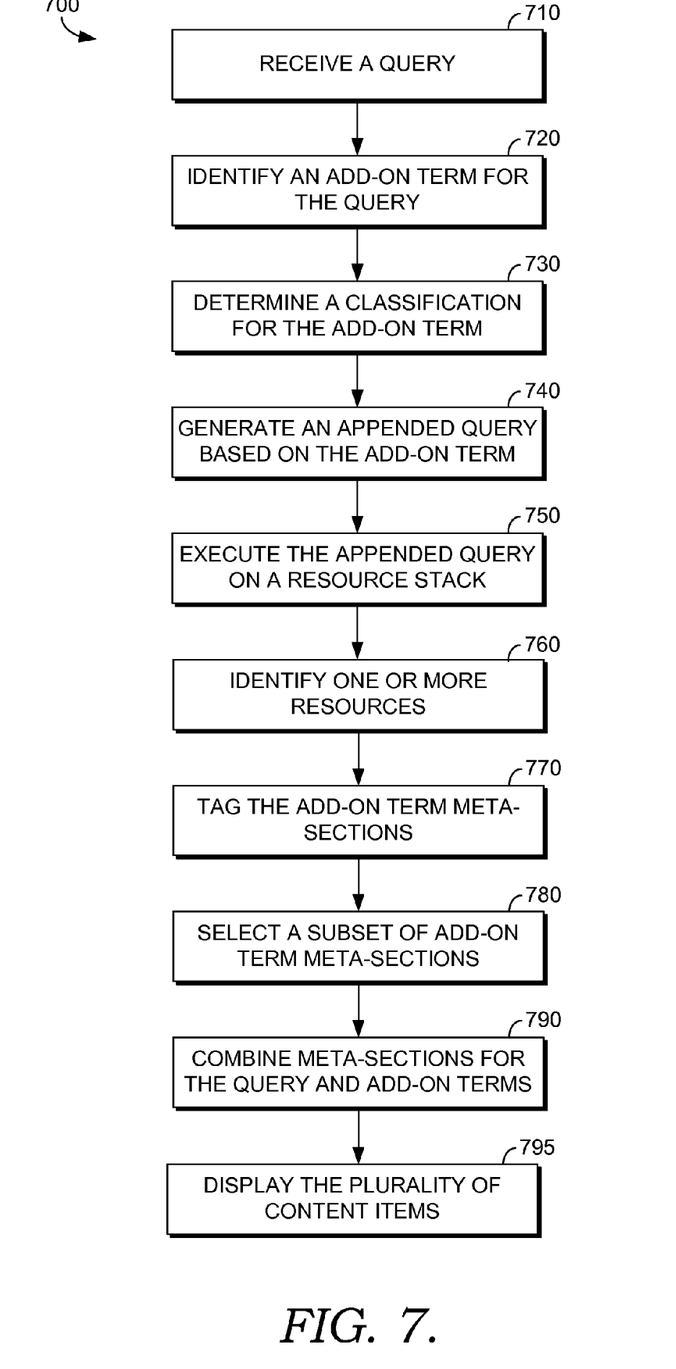
FIG. 7 is a flow diagram showing a method for query expansion using add-on terms with an embodiment of the present invention.

Turning now to FIG. 7, a flow diagram is provided that illustrates a method 600 for query expansion using add-terms with assigned classifications. Initially, as shown at block 710, a query is received. The query is associated with a default classification that distinguishes the query. At block 720, an add-on term is identified for the query. A classification for the add-on term is determined at block 730. The classification distinguishes query meta-sections from add-on term meta-sections. At block 740, an appended query is generated by concatenating the query with the add-on term. The appended query is executed on a resource stack as a single reformulated query, at block 750. At block 760, one or more resources are identified based on the appended-query. Each of the one or more resources includes query meta-sections and add-on term meta-sections with each query meta-section and each add-on term meta-section having an instance of the respective query and the add-on term. At block 770, the add-on term meta-sections are tagged with the classification of the add-on term to distinguish the add-on meta-sections from the query meta-sections. A subset of the add-on term meta-sections based on a plurality of features of the add-on term meta-sections is selected at block 780. A feature is restriction assigned to the add-on term meta-sections. At block 790, the query meta-sections and the subset of add-on term meta-sections are combined to generate a plurality of content items. At block 795, the plurality of content items is displayed.

Embodiments of our present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. One or more computer-readable storage media storing computer-useable instructions that, when used by one or more computing devices, cause the one or more computing devices to perform a method for query expansion based on add-on terms with assigned classifications, the method comprising:
   receiving a query;
   identifying an add-on term for the query;
   determining a classification for the add-on term;
   generating an appended query by concatenating the query with the add-on term, wherein the add-on term comprises the classification; and
   executing the appended query on a resource stack as a single reformulated query to identify one or more resources for the appended query, wherein executing the appended query comprises:
   tagging an add-on meta-section of the one or more resources with the classification of the add-on term, wherein the classification distinguishes a query meta-section of the query from the add-on meta-section;
   selecting at least a subset of add-on term meta-sections; and
   accessing query meta-sections and the subset of add-on term meta-sections to generate content items.

2. The media of claim 1, wherein the query is associated with a default classification different from the classification for the add-on term.

3. The media of claim 1, wherein identifying the add-on term further comprises:
   identifying a plurality of add-on terms for the query;
   ranking the plurality of add-on terms based on a relevance threshold; and
   selecting one or more add-on terms for the query.

4. The media of claim 3, wherein identifying the plurality of add-on terms for the query includes identifying a reformulation of one or more terms in the query.

5. The media of claim 3, wherein identifying the plurality of add-on terms for the query includes identifying one or more context-based add-on terms.

6. The media of claim 1, wherein determining the classification for the add-on term further comprises:
   identifying a strong type from a plurality of predetermined strong types within a type system; and
   assigning the strong type to the add-on term.

7. The media of claim 1, wherein tagging the one or more resources identified for the add-on term further comprises:
   identifying a label for a meta-section in the one or more resources, wherein the meta-section includes an instance of the add-on term; and
   appending the label with the classification of the add-on term.

8. The media of claim 1, wherein retaining the classification of the add-on term comprises tagging meta-sections that contain the add-on term with the classification of the add-on term during execution.

9. A system for performing a method for query expansion based on add-on terms with assigned classifications, the system comprising:
   a resource server configured for:
   receiving an appended query that has been concatenated using a query and an add-on term, wherein the add-on term is assigned a classification; and
   executing the appended query on a resource stack as a single reformulated query, wherein executing on the resource stack comprises:
   identifying one or more resources for the appended query;
   identifying query meta-sections and add-on term meta-sections in the one or more resources;
   tagging the at least one meta-section that includes an instance of the add-on term with the classification of the add-on term, wherein the classification distinguishes the query meta-section identified for the query from the add-on meta-sections identified for the add-on term; and generating a plurality of content items based on the one or more resources based on:

selecting at least a subset of add-on term meta-sections based on at least one feature of a plurality of features of the add-on term meta-sections; and combining query meta-sections and the subset of add-on term meta-sections to generate content items.

10. The system of claim 9, wherein the classification assigned to the add-on term is a predetermined strong type from a type system.

11. The system of claim 9, wherein the each of the one or more resources includes an instance of the query and the add-on term of the appended query.

12. The system of claim 9, wherein tagging the at least one meta-section further comprises:

identifying a label for the at least one meta-section associated with the add-on term; and appending the label with the classification of the add-on term.

13. The system of claim 9, further comprising:

clustering the one or more resources based on the classification of a plurality add-on terms for the query; and communicating for display the plurality of content items for the one or more resources in clusters of the plurality of add-on terms.

14. A method for query expansion using add-on terms with assigned classifications, the method comprising:

receiving a query, wherein the query is associated with a default classification;

identifying an add-on term for the query;

determining a classification for the add-on term, wherein the classification distinguishes query meta-sections from add-on term meta-sections;

generating an appended query by concatenating the query with the add-on term; and executing the appended query on a resource stack as a single reformulated query, wherein executing the appended query on the resource stack comprises:

identifying one or more resources based on the appended query, wherein each of the one or more resources includes query meta-sections and add-on term meta-sections with each query meta-section and each add-on term meta-section having an instance of the respective query and the add-on term;

tagging the add-on term meta-sections with the classification of the add-on term to distinguish the add-on meta-sections from the query meta-sections;

selecting a subset of the add-on term meta-sections based on a plurality of features of the add-on term meta-sections, wherein a feature is restriction assigned to the add-on term meta-sections;

combining query meta-sections and the subset of add-on term meta-sections to generate a plurality of content items; and communicating for display the plurality of content items.

15. The method of claim 14, wherein identifying an add-on term further comprises:

determining that the query term is associated with a ranker, wherein the ranker is vertical information domain; and identifying the add-on terms based on a plurality of predetermined classifications for the ranker.

16. The method of 14, further comprising:

tagging the query meta-sections with the default classification of the query to distinguish the query meta-sections from the add-on term meta sections.

17. The method of claim 14, wherein tagging the add-on term meta-sections with classification of the add-on term further comprises:

identifying a label for an add-on term meta-section in the one or more resources; and appending the label with the classification of the add-on term.

18. The method of claim 14, further comprising:

clustering the one or more resources based on the classification of a plurality add-on terms for the query; and communicating for display the plurality of content items for the one or more resources in clusters of the plurality of add-on terms.

19. The method of claim 18, wherein the query is an ambiguous name query.

20. The method of claim 14, wherein the resource server does not execute the appended query on the resource stack more than once.

* * * * *